United States Patent [19]

Mori

[11] Patent Number: 4,483,322
[45] Date of Patent: Nov. 20, 1984

[54] WATER HEATING APPARATUS

[75] Inventor: Kinya Mori, Aichi, Japan

[73] Assignee: Sanyo Machine Works, Limited, Aichi, Japan

[21] Appl. No.: 368,582

[22] Filed: Apr. 15, 1982

[30] Foreign Application Priority Data

Jul. 2, 1981 [JP] Japan .................. 56-104248

[51] Int. Cl.³ .................................. F24J 3/02
[52] U.S. Cl. ........................ 126/437; 126/433; 126/442; 126/435; 126/427; 62/235.1
[58] Field of Search .............. 126/442, 433, 432, 434, 126/437, 428, 427, 435; 62/235.1

[56] References Cited

U.S. PATENT DOCUMENTS

| | | | |
|---|---|---|---|
| 2,689,090 | 9/1954 | Wetherbee et al. | 62/235.1 X |
| 4,173,994 | 11/1979 | Hiser | 126/427 X |
| 4,242,873 | 1/1981 | Hino | 62/235.1 |
| 4,285,333 | 8/1981 | Tanaka et al. | 126/433 |
| 4,308,042 | 12/1981 | Ecker | 126/427 |
| 4,406,136 | 9/1983 | Picchiottino | 126/435 X |

FOREIGN PATENT DOCUMENTS 100136  8/1979  Japan .................. 126/427

OTHER PUBLICATIONS

"Solar-Powered Refrigeration", Mechanical Engineering, Jun. 1971, vol. 93, No. 6, pp. 22-24.

Primary Examiner—Larry Jones
Attorney, Agent, or Firm—Armstrong, Nikaido, Marmelstein & Kubovcik

[57] ABSTRACT

A water heating apparatus comprising a refrigerant loop for natural circulation which includes a hot water storage tank for holding water to be heated, a heat collecting plate for collecting solar heat, and refrigerant tubes having a refrigerant sealed therein and extending to unite the hot water storage tank with the heat collecting plate and another refrigerant loop for refrigeration cycle which includes a compressor and an expansion valve which are connected in the refrigerant tube uniting the hot water storage tank with the heat collecting plate. The water in the hot water storage tank is elevated in temperature selectively by the natural circulation action where there is a sufficient amount of sunshine or by the refrigeration cycle where the amount of sunshine is insufficient.

2 Claims, 5 Drawing Figures

WATER HEATING APPARATUS

The present invention relates to a water heating apparatus which makes use of solar heat, and more particularly it relates to a water heating apparatus adapted to provide hot water by the natural circulation action of a refrigerant when there is a sufficient amount of sunshine and by refrigeration cycle when the amount of sunshine is insufficient.

As for conventional water heating apparatuses, one using a solar water heater, another using an air heat source heat pump, and another using, in combination, a solar water heater and an air heat source heat pump are known. In the conventional solar water heater, however, in cases where the amount of sunshine is insufficient or the heat quantity is insufficient with the sunlight alone used, the temperature of the water in the hot water storage tank can hardly be raised, and there is a danger of the water freezing in winter. The air heat source heat pump is significant as an energy-saving unit, but it requires defrosting in winter and uses electric energy exclusively as its power source, thus offering a problem today when electric power peak cut in summer season is being clamored for. The type using these two in combination is high in the cost of installation, offering a problem about depreciation. As described the conventional types have their own demerits.

Accordingly, with the above in mind, the present invention contemplates providing a water heating apparatus based on a novel concept, having the merits of the solar water heater and of the heat pump.

More particularly, the invention provides a water heating apparatus designed such that when the sunshine is sufficient, the natural circulation action of a refrigerant making use of sunlight is used without resorting to mechanical power, while when the amount of sunshine is insufficient or the heat quantity is insufficient with sunlight alone used, it is switched to refrigeration cycle using also the heat produced in the process of adiabatic compression by a compressor, to forcibly heat the water in the hot water storage tank.

A water heating apparatus according to the invention comprises a hot water storage tank for holding water to be heated, a heat collecting plate for collecting solar heat, and refrigerant tubes having a refrigerant sealed therein and extending to unite the hot water storage tank with the heat collecting plate to form a refrigerant loop, so that during sunshine, the refrigerant naturally circulates in this refrigerant loop and gives the water in the hot water storage tank the heat it receives from the heat collecting plate. Therefore, when the amount of sunshine is sufficient so that the solar light alone is enough to provide a sufficient amount of heat received, the heat collecting plate heated by solar light is used as a heat source without resorting to mechanical power, and the water in the hot water storage tank is elevated in temperature by the natural circulation action of the refrigerant.

The water heating apparatus of the invention may further comprise a compressor and an expansion unit which are connected in the refrigerant tube uniting the hot water storage tank with the heat collecting plate to form a refrigerant loop for a refrigeration cycle, and a switching valve for making a switch between the system for elevating the temperature of the water in the hot water storage tank by the natural circulation action of the refrigerant and the system for elevating the temperature of the water in the hot water storage tank by the refrigeration cycle. This arrangement has, besides such feature referred to above, another one that when the amount of sunshine is insufficient (as in cloudy weather, rainy weather, and in the night) or when the heat quantity is insufficient with the solar light alone used (as when the temperature of water fed to the hot water storage tank is low or the atmospheric temperature is low), making a switch to the refrigeration cycle using the heat pump makes it possible to obtain hot water at sufficient temperature by utilizing also the heat produced as a result of adiabatic compression by the compressor, in contrast to the conventional solar water heater, with the result that hot water can be obtained even in winter season and in the night and the apparatus can be used for a long period of time without any danger of being damaged by freezing. Further, as compared with the conventional air heat source heat pump, it is possible to obtain heat of evaporation by the heat collecting plate, eliminating the need for defrosting even in winter season and in the night. Thus, the efficiency is high. Considering that sunshine in the daytime can be effectively utilized, it is only necessary to install a compressor which requires smaller input than that required by the air heat source heat pump type, thus contributing to energy saving and cost saving. Further, since the power source for the compressor providing an auxiliary heat source uses electricity as opposed to gas or other fuel, the trouble of installing fuel piping and providing a space for fuel storage can be saved. Installation of the apparatus is very simple and there is no need to worry about exhaust gases. Moreover, since the power source for the entire apparatus is electricity, there is another feature that automatic control can be performed with ease.

According to another embodiment of the invention, the natural circulation loop of the refrigerant is provided with a heat exchanger separate from that for the refrigeration cycle, so that the efficiency of heat exchange of the refrigeration cycle is increased.

These and other objects and features of the invention will become more apparent from the following description to be given with reference to the accompanying drawings, in which.

Figure 1:
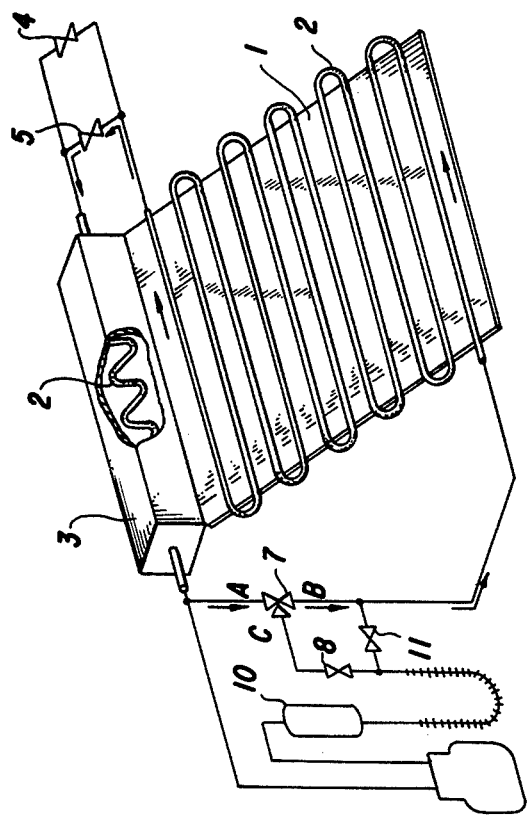
FIG. 1 is a schematic circuit diagram showing an embodiment of the invention wherein a heat collecting plate alone is used as a heat source.
Figure 2:
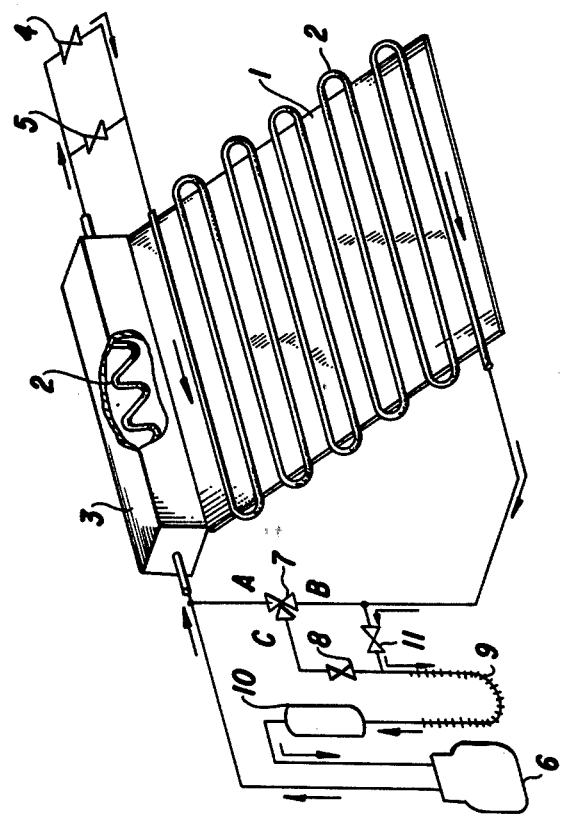
FIG. 2 is a schematic circuit diagram similar to FIG. 1, showing the normal operation of the apparatus using both a heat collecting plate and a compressor.
Figure 3:
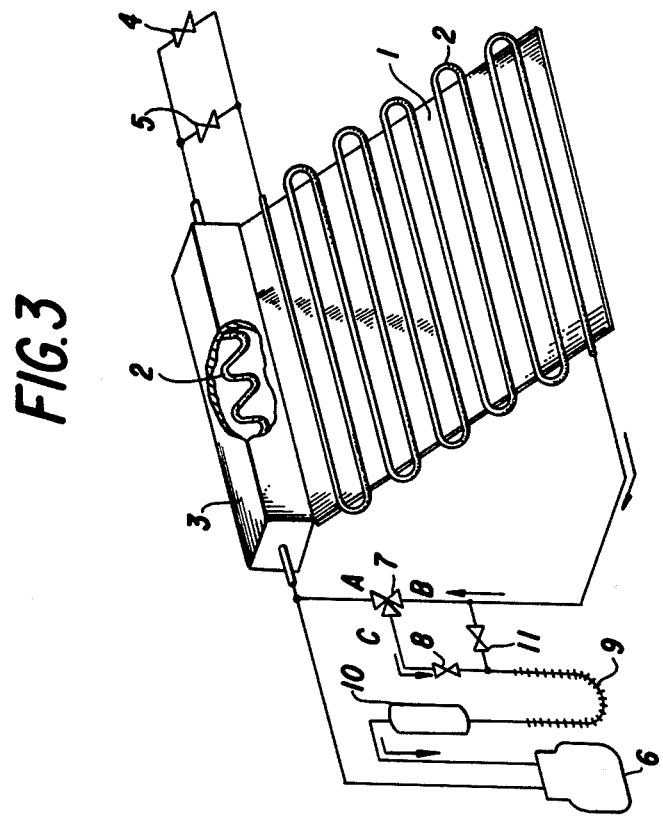
FIG. 3 is a schematic circuit diagram similar to FIG. 1, showing a preparatory process prior to the normal operation shown in FIG. 2.

Referring to FIGS. 1 through 3 showing an embodiment of the invention, 1 denotes a heat collecting plate internally having refrigerant tubes 2 connected in series or partly in parallel. In the drawings, the heat collecting plate 1 is shown as being constructed such that it is exposed to the atmosphere rather than covered with a cover or heat insulator. The numeral 3 denotes a hot water storage tank installed above the heat collecting plate 1 and internally having refrigerant tubes 2 connected in series or partly in parallel, the refrigerant tubes being connected to those of the heat collecting plate 1 to form a closed loop and having a slope to allow the refrigerant to flow freely from the hot water collecting tank 3 down into the refrigerant tubes in the heat collecting plate 1. An expansion unit 4 and a solenoid valve 5 are placed in the refrigerant tube which connects the upper end of the hot water storage tank 3 to the upper portion of the heat collecting plate 1.

The numeral 6 denotes a compressor serving to adiabatically compress the refrigerant gas from the lower portion of the heat collecting plate 1 and feed it into the refrigerant tubes in the hot water collecting tank 3. A three-way valve 7, an expansion unit 8 and a finned tube 9 are connected in series, and a solenoid valve 11 bypasses the three-way valve 7 and the expansion unit 8 and forms a short circuit connecting the finned tube 9 and the refrigerant tube extending from the lower portion of the heat collecting plate 1.

The way of using the present apparatus constructed in the manner described above will now be described. First, in cases where the amount of sunshine is sufficient, i.e., the amount of received heat is sufficient with solar light alone used, the heat collecting plate 1 alone is used as the heat source. In this case, as shown in FIG. 1, the three-way valve 7 is switched to connect lines A and B and the solenoid valve 11 is closed so as to establish direct connection between the hot water storage tank 3 and the lower portion of the heat collecting plate 1 and cut off communication with the compressor 6, while the solenoid valve 5 is opened. In the above condition, if the sunlight hits the heat collecting plate 1, the latter is heated and the refrigerant flon gas or the like in the refrigerant tubes in the heat collecting plate 1 obtains this heat to become a high temperature vapor, which enters the hot water storage tank 3 via the solenoid valve 5. Therein, the refrigerant vapor gives its heat to the water in the hot water storage tank 3 and condenses, the liquefied refrigerant flowing through the three-way valve 7 in the A-to-B direction back into the lower portion of the heat collecting plate 1. Thus, a refrigerant circulation loop indicated by arrows in FIG. 1 is formed and hot water at sufficient temperature is collected in the hot water storage tank 3.

If amount of sunshine is insufficient or the heat quantity is insufficient with the sunlight alone used, not only the heat collecting plate 1 heated by sunlight is used as a heat source, but also the heat to be generated in the adiabatic compression process of the refrigerant gas by means of the compressor 6 is used. In this case, as a preparatory process the three-way valve 7 is switched to establish communication between lines B and C, as shown in FIG. 3, while the solenoid valve 11 is closed and then the solenoid valve 5 is closed, whereupon the compressor 6 is driven to introduce the refrigerant liquid collecting in the refrigerant line in the lower portion of the heat collecting plate 1 into the expansion unit 8, where it is gasified, the gas being drawn into the compressor 6. At the time when the refrigerant liquid in the heat collecting plate has disappeared, the preparatory process is completed, whereupon the solenoid valve 11 is opened to bypass the expansion unit 8, thereby initiating the normal operation forming the refrigeration cycle.

As shown in FIG. 2, the refrigerant gas adiabatically compressed by the compressor 6 enters the refrigerant tubes 2 in the hot water storage tank. Therein, the refrigerant gas gives its heat to the water in the hot water storage tank 3 and condenses. The liquefied refrigerant adiabatically expands in the expansion unit 4 and is fed to the refrigerant tubes 2 in the heat collecting plate 1. The refrigerant fed to the refrigerant tubes in the heat collecting plate is usually 10°-20° C. lower in temperature than the atmospheric temperature, so that it is evaporated by the atmosphere and solar heat through the intermediary of the heat collecting plate 1 and returns to the compressor successively through the finned tube 9 and accumulator 10. Thus, a refrigerant circulation loop indicated by arrows is formed, and hot water at sufficient temperature is collected in the hot water storage tank 3.

Figure 4:
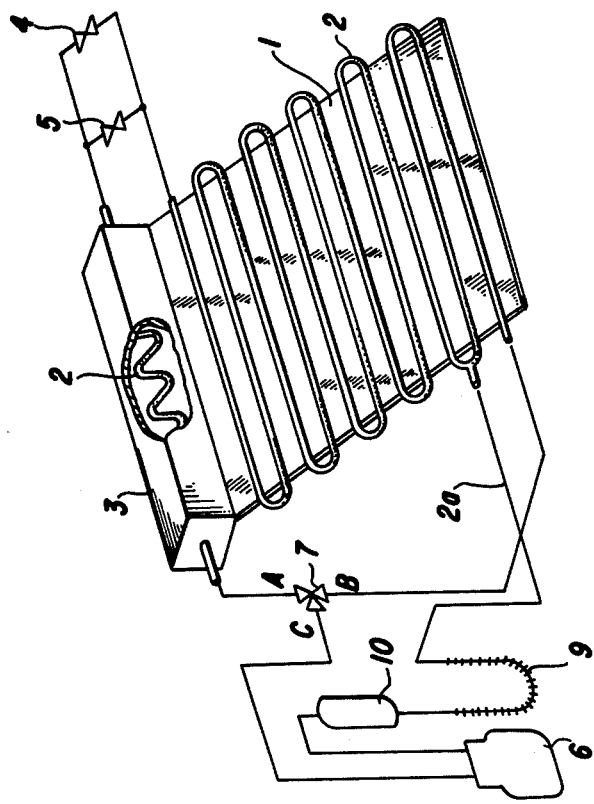
FIG. 4 is a schematic circuit diagram showing a water heating apparatus according to another embodiment of the invention.

Now, referring to FIG. 4 showing a second embodiment of the invention, wherein like parts are denoted by like reference numerals, the expansion unit 8 and solenoid valve 11 installed in the refrigerant line extending from the lower portion of the heat collecting plate 1 to the finned tube 9 in the preceding embodiment are omitted, and a refrigerant tube disposed somewhat above the lowermost one installed in the heat collecting plate 1 (in FIG. 4, the second from the bottom) is connected to the finned tube 9 by a separate refrigerant tube 2a.

In this case, the three-way valve 7 is designed such that when the compressor 6 is used it establishes communication between lines A and C while blocking communication between lines A and B and between lines B and C and when the compressor 6 is not used, it establishes communication between lines A and B while cutting off communication between lines A and C and between lines B and C.

As for the operation of the apparatus according to this embodiment, it is exactly the same as in the preceding embodiment when the amount of sunshine is sufficient, but where the compressor 6 is used, the refrigerant vapor is drawn through the refrigerant tube 2a connected at a place somewhat above the bottom of the heat collecting plate 1 and then through the finned tube 9 and the accumulator 10, and it is adiabatically compressed and fed into the hot water storage tank 3. Thus, the refrigerant liquid collecting in the bottom of the heat collecting plate 1 is not directly drawn into the compressor 6, thereby protecting the latter.

This embodiment saves the need of the solenoid valve 11 and expansion unit 8 provided in the preceding embodiment and requires correspondingly less cost of installation. It has another merit that it saves the need of the preparatory process shown in FIG. 3, so that control of the apparatus is simple.

Figure 5:
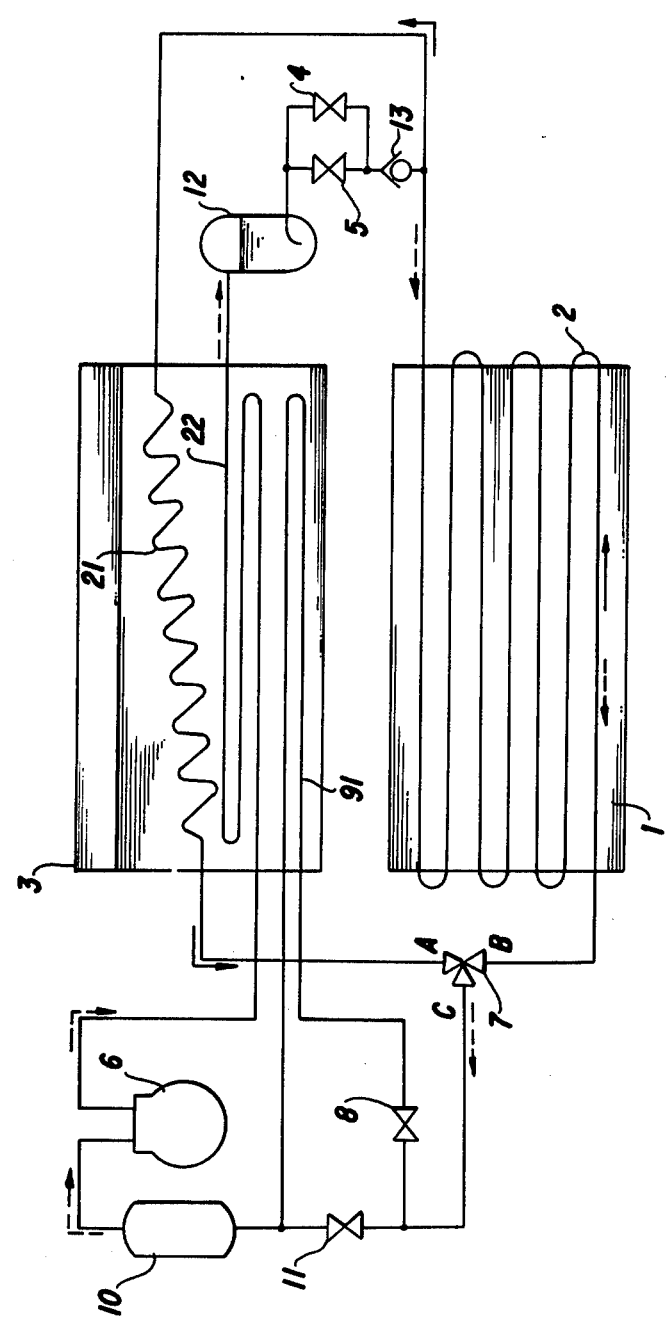
FIG. 5 is a schematic circuit diagram showing a water heating apparatus according to a further embodiment of the invention.

A third embodiment of the invention shown in FIG. 5 will now be described. As mentioned earlier, like parts are denoted by like reference numerals throughout the drawings.

In this embodiment, which is intended for increased efficiency, the hot water storage tank is internally provided with heat exchangers for separate use during natural circulation and during refrigeration cycle. More particularly, a first heat exchanger or refrigerant tube 21 is connected in series with the refrigerant tube 2 in the heat collecting plate 1, defining a closed refrigerant loop. The refrigerant tube 21 is so sloped that the refrigerant charged therein may flow by gravity down toward the refrigerant tube 2 in the lower portion of the heat collecting plate 1. A second heat exchanger or refrigerant tube 22 is connected in series with the refrigerant tube 2 but in parallel with the refrigerant tube 21. One end of the refrigerant tube 22 leads to an upper end of the refrigerant tube 2 via a refrigerant receiver 12, with an expansion unit 4 and a solenoid valve 5 in parallel with the former being incorporated between the refrigerant receiver 12 and the refrigerant tube 2.

The heat collecting plate 1 alone is used as a heat source where there is a sufficient amount of sunshine, i.e., a sufficient amount of heat is available with sunlight alone. When sunlight hits the heat collecting plate 1, the refrigerant inside the refrigerant tube 2 comes to the boil and vaporizes. When the three-way valve 7 establishes communication between lines A and B with the solenoid valve 5 closed, the vapour moves under the pressure of natural convection through the refrigerant tube 2 upward into the heat exchanger 21 located in the water storage tank 3. As a result of giving off heat which the surrounding water receives, it condenses back into a liquid and flows by gravity via the three-way valve 7 back down to the refrigerant tube 2 in the lower end of the heat collecting plate 1. Thus, the refrigerant loop as shown by the arrows in solid lines, ensuring the continuous transfer of solar energy to the storage water.

If the amount of sunshine is insufficient or the heat quantity available is insufficient with the sunlight alone, the heat to be generated in the adiabatic compression process of the refrigerant gas by means of the compressor 6 is used as a heat source in addition to the heat collecting plate 1 heated by sunlight. In this case, first in a preparatory process, the three-way valve 7 is actuated to establish communication between lines B and C and the compressor 6 is started to operate, with the solenoid valves 5 and 11 closed. Thus, the liquid refrigerant collected in the refrigerant line in the lower portion of the heat collecting plate 1 is gasified at the expansion unit 8 and the resultant gaseous refrigerant is drawn into the compressor 6. Upon no liquid refrigerant remain in the refrigerant line, the preparatory process is completed.

Then the solenoid valve 11 is opened to bypass the expansion unit 8, thereby initiating the normal operation of the refrigeration cycle. The refrigeration gas of high temperature and high pressure from the compressor 6 passes into the second heat exchanger 22 where it condenses, giving heat to the surrounding water. The resultant condensate passes into the refrigerant receiver 12 and further, via the expansion unit 4, toward the refrigerant tube 2 in the upper end of the heat collecting plate 1. The refrigerant is now of low pressure because of its adiabatic expansion at the expansion unit 4 and, therefore, vaporizes at lower temperatures with a little amount of heat received from the atmosphere. The refrigerant gas passes from the refrigerant tube 2 in the lower end of the heat collecting plate 1, through the three-way valve 7, the solenoid valve 11 and the accumulator 10, toward the compressor 6.

Thus, the increased efficiency of heat exchange, particularly for refrigeration cycle, is ensured since the separate heat exchangers in the water storage tank are used for natural circulation and for refrigeration cycle as described above.

After the apparatus stops its operation under refrigeration cycle, the solenoid valve 5 is opened so that the liquid inside the refrigerant receiver 12 returns back into the refrigerant tube 2, making the refrigerant receiver 12 empty. A check valve 13 serves to prevent the refrigerant gas, which during natural circulation should pass from the refrigerant tube 2 to the first heat exchanger 21, from flowing into the second heat exchanger 22 through the expansion valve 4 and the solenoid valve 5.

A third heat exchanger 91 performs the same function as the finned tube 9. Therefore, a heat exchanger or refrigerant tube located in parallel with the expansion unit 8 in the water storage tank 3 as indicated at 91 may be substituted for the finned tube 9 adopted in the embodiments of FIGS. 1 to 4. The expansion unit 8 is, however, for the purpose of overload prevention at the start of the compressor 6 and hence the expansion unit 8 and also the finned tube 9 or the third heat exchanger 91 are not essential to the invention.

The compressor 6 and refrigerant receiver 12 may be installed in the water storage tank 3, in which case the thermal efficiency of the apparatus is higher. It is also deemed effective to cover the upper surface of the heat collecting plate with a cover, such as a glass cover, to increase the efficiency during natural circulation.

As many apparently widely different embodiments of this invention may be made without departing from the spirit and scope thereof, it is to be understood that the invention is not limited to the specific embodiments thereof described and shown herein except as defined in the appended claims.

What is claimed is:

1. A water heating apparatus, comprising:
a hot water storage tank holding water to be heated;
a heat collecting plate for collecting solar heat;
a refrigerant tube or refrigerant tubes having a refrigerant sealed therein and extending to unite said hot water storage tank with said heat collecting plate to thereby form the first refrigerant loop having a first heat exchanger in said hot water storage tank, whereby during sunshine, the refrigerant naturally circulates to impart heat, which it receives from the heat collecting plate, to the water in said hot water storage tank through said first heat exchanger;
a compressor and an expansion unit united in said refrigerant tube so as to form a second refrigerant loop including the portion of said first refrigerant loop in said solar collector for the refrigeration cycle said second refrigerant loop having a second heat exchanger in said hot water storage tank; and
a switching valve for making a switch between the system for elevating the temperature of the water in said hot water storage tank by the natural circulation of the refrigerant and the system for elevating the temperature of the water in the hot water storage tank by the refrigeration cycle said hot water storage tank containing said first and second heat exchangers being undivided.

2. A water heating apparatus as set forth in claim 1, wherein said heat collecting plate is exposed to the atmosphere and the refrigerant flowing through the refrigerant tubes during the refrigeration cycle absorbs heat from the air surrounding the heat collecting plate.

* * * * *